Figure 1:
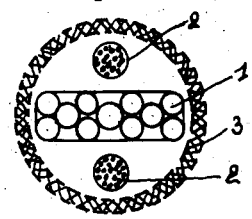

Sept. 7, 1937.  H. H. HOLLENWEGER  2,092,532
EXTENSIBLE ELECTRIC CORD
Filed July 30, 1935

Inventor
Hans Heinrich Hollenweger
By
Pennie, Davies, Marvin + Edmonds
Attorneys.

Patented Sept. 7, 1937

2,092,532

UNITED STATES PATENT OFFICE 2,092,532

EXTENSIBLE ELECTRIC CORD

Hans Heinrich Hollenweger, Zofingue, Switzerland, assignor to Herman Arthur Ungemuth, Paris, France Application July 30, 1935, Serial No. 33,816
In Germany April 11, 1934

5 Claims. (Cl. 173—264)

The present invention relates to electric conducts and more particularly to extensible conducting cords.

Cords of this kind generally comprise rubber threads giving a resilient effect, and an extensible metal structure, for example a spiral of wire. Usually a rubber core serves as a support for the metal structure. It has been noticed that in cords of this type comprising wires spirally wound on a rubber core, said core wears out very rapidly. The same has been noticed when the wires are not simply wound but plaited on a rubber core; and when rubber threads are incorporated by interlacing in a plait or other structure made of inextensible wires or threads, such rubber threads likewise become rapidly worn.

The inventor has found that this defect was caused by the intimate contact between the rubber thread or threads and the other elements of the cord, in combination with the fact that the inner space or interstices of a structure such as a plait or a spiral tighten together when the cord is extended, to a much greater extent than the core or the interlaced rubber threads contract.

Under these circumstances the nonresilient threads, and particularly the wires, sink into the rubber, so that the rubber threads are sawn at numerous points and are rapidly destroyed.

Consequently, the object of the invention is to provide an extensible cord in which the rubber threads are not in intimate contact with the other elements but are arranged to have a certain freedom, so that they are not subjected to any abnormal wear, the cord thus constituted being very durable.

Another object of this invention is to provide an extensible cord the metal structure of which does not require to be supported by a core, so that the cord is not rendered unfit for use by the rapid destruction of such core.

The conducting plaits can include bare wires forming a conductor with several wires, or they can include insulated wires so as to constitute a multiple conductor. They can also include non-conducting threads.

The invention will be described in greater detail with reference to the accompanying diagrammatic drawing.

In the drawing,

Fig. 1 is a diagrammatic cross-sectional view, chiefly representational, of one embodiment of the invention;

Figs. 2 to 11 inclusive are similar views of other embodiments thereof.

In Fig. 1, a flat conducting plait 1 is combined with two rubber threads 2 arranged on either side of the latter, the assembly of the plaits and the rubber threads being surrounded by an insulating plait 3. When this cord is extended, the inner space of the plait 3 diminishes, but the cross section of the metal plait 1 also diminishes, so that the space left for the rubber threads does not diminish much. The rubber threads can be arranged with a certain clearance, but such clearance can be very small, or the insulating plait can even be applied against the rubber threads, in view of the fact that the elongation of the cord can only, at the most, cause a flattening of the rubber threads, which have for such flattening, considerable reserve space at the sides. On the contrary, in the known cords, the rubber threads were in intimate contact with the other threads and wires which surround them on all sides, so that as a result of the diminution of the space in which they were lodged, a complex deformation occurred which was produced by the wires and the threads which surround them penetrating separately into the rubber threads. This penetration is capable of destroying the rubber rapidly, whereas a slight flattening of the rubber threads does not shorten their life.

Figure 2:
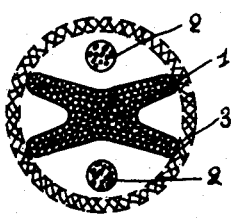

In Fig. 2, the metal plait, instead of being flat is X-shaped.

It is understood that all the insulating plaits illustrated in the drawing can be double or multiple or have extensible insulating sheaths other than plaits, as will be seen hereinafter.

Figure 3:
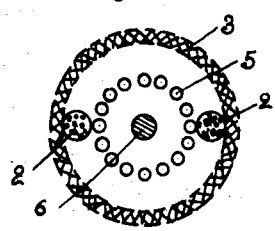

In Fig. 3, the cord comprises an inner metallic tubular plait 5 and an outer insulating plait 3, the rubber threads 2 being arranged between said two plaits. In this case likewise, the free arrangement of the threads does not consist in the fact that they are arranged with a considerable clearance, but above all in the fact that they have a considerable reserve space between the two plaits, so that the tightening of the plaits can at the most, only cause a slight flattening of the threads.

Within the metal plait 5 is arranged an inextensible thread 6 having a length such that the cord cannot be extended beyond the required amount. As the ends of the thread 6 are accessible at the ends of the cord, its length can be adjusted so as to give any required elongation.

Figure 4:
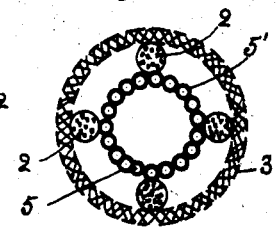

In Fig. 4, the arrangement is similar to Fig. 3. However the conductors 5' which compose the conducting plait 5 are insulated separately instead of being bare. They are for example enamelled or covered.

This arrangement enables a multiple conductor to be constructed in all the cases in which the insulation between the individual conductors is not required to be very high, for example, for low tension purposes. The rubber threads 2 are four in number. It is moreover obvious that in all the modifications any required number of resilient threads can be provided.

Figure 5:
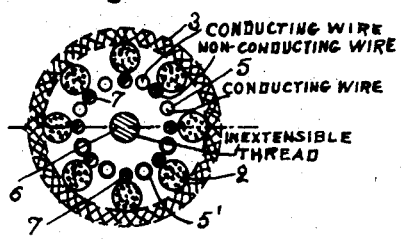

In Fig. 5, the inner plait 5 comprises, in addition to the conducting wires, nonconducting threads 7. The conducting wires themselves can be bare, as seen in the upper part of Fig. 5, or insulated, as illustrated in the lower part of said figure. In this case, 8 rubber threads 2 have been shown between the plait 5 and the outer insulating plait 3.

Figure 6:
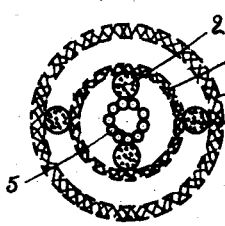

In Fig. 6, the cord likewise comprises an inner tubular plait 5 and rubber threads 2 arranged between said plait and an insulating plait 3. The insulating plait 3 is surrounded in its turn by another insulating plait 3' and between said two plaits are arranged other rubber threads 2'.

Figure 7:
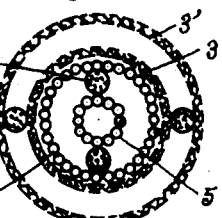

Fig. 7 illustrates a modification similar to Fig. 6 in which the inner insulating sheath, constituted by the plait 3, in Fig. 6, is constituted by a covering of rubber ribbon 8.

So far modifications have been shown in which the rubber threads are arranged between a metal plait and an insulating plait or between two extensible insulating plaits or other extensible insulating sheaths.

Figure 8:
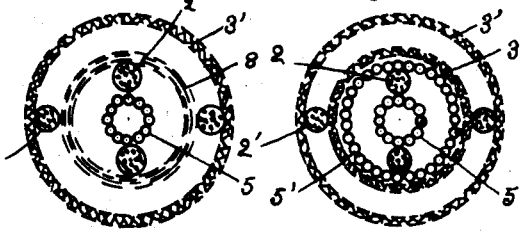

In the modification illustrated in Fig. 8, rubber threads 2 are arranged between an inner tubular metal plait 5 and a metal plait 5' surrounding the former. Furthermore, in this modification rubber threads 2' are arranged between two insulating plaits 3 and 3' which surround the conducting plaits.

Figure 9:
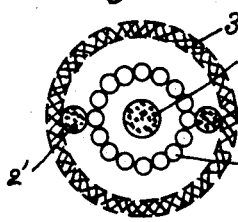

In Fig. 9, the cord comprises a tubular metal plait 5 and an insulating plait 3. The rubber thread 2 is arranged inside the metal plait 5. Extensible conductors in which the metal plait is wound on a rubber core are known, but in the present case the metal plait is independent and the rubber thread is lodged within same with a considerable clearance. In this manner, and contrary to the known arrangement, the tightening of the plait 5 when the cord is extended does not injure the rubber thread 2. There are other rubber threads 2' arranged between the conducting plait 5 and the insulating plait 3.

Figure 10:
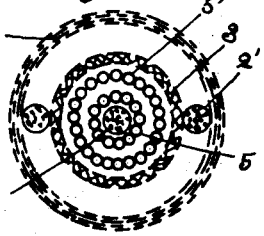

In the modification in Fig. 10 the cord comprises a central rubber thread 2 arranged with a clearance in an inner conducting plait 5, a conducting plait 5' surrounding the latter, an insulating plait 3, an extensible insulating covering 9 and rubber threads 2' arranged between said covering and the plait 3.

It is obvious that in all the modifications the wire of the metal plait can be bare, insulated, or combined with nonconducting threads. The thread 6 limiting the extension, shown in Fig. 4, can also be provided in all the other modifications, either in the center of an inner tubular covering or between two plaits or sheaths.

Figure 11:
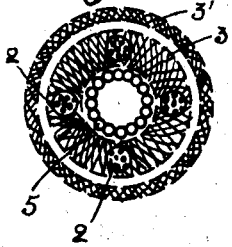

In Fig. 11, the rubber threads 2 are lodged in the body of the insulating plait 3. Said plait is covered with a plait 3'. This arrangement can be combined with all the others: in particular, another rubber thread can be lodged in the conducting plait 5.

By the term "plait" is meant that intertwining of strands of the material which includes also the term "braid".

I claim:

1. Extensible conducting cord comprising a metal conducting plait, an extensible insulating sheath surrounding same, and a plurality of longitudinal resilient threads arranged symmetrically outside said plait but inside said sheath.

2. Extensible conducting cord comprising a metal conducting plait, a plurality of concentric extensible insulating sheaths surrounding same and a plurality of longitudinal resilient threads arranged symmetrically between said sheaths.

3. Extensible conducting cord comprising a metal conducting plait, an extensible insulating sheath surrounding same, said sheath including an insulating plait, and a plurality of longitudinal resilient threads arranged symmetrically in the body of said insulating plait.

4. Extensible conducting cord comprising a metal conducting plait, which plait includes nonconducting threads, an extensible insulating sheath surrounding same, and a plurality of longitudinal resilient threads arranged symmetrically outside said plait but inside said sheath.

5. Extensible electric cord, comprising an extensible conducting structure, an extensible insulating sheath surrounding same, a plurality of longitudinal resilient threads arranged symmetrically and eccentrically in the cord, and means adapted to prevent said threads from shifting out of said symmetrical arrangement.

HANS HEINRICH HOLLENWEGER.